US006991026B2

(12) United States Patent
Costen et al.

(10) Patent No.: US 6,991,026 B2
(45) Date of Patent: Jan. 31, 2006

(54) HEAT EXCHANGER WITH HEADER TUBES

(75) Inventors: Michael K. Costen, Milford, CT (US); Cezar I. Moisiade, Bridgeport, CT (US)

(73) Assignee: Ingersoll-Rand Energy Systems, Portsmouth, NH (US)

( * ) Notice: Subject to any disclaimer, the term of this patent is extended or adjusted under 35 U.S.C. 154(b) by 26 days.

(21) Appl. No.: 10/872,740

(22) Filed: Jun. 21, 2004

(65) Prior Publication Data

US 2005/0279080 A1 Dec. 22, 2005

(51) Int. Cl.
*F28F 3/00* (2006.01)
*F02C 7/10* (2006.01)

(52) U.S. Cl. .................................. 165/167; 60/39.511

(58) Field of Classification Search ................ 165/167; 60/30.511

See application file for complete search history.

(56) References Cited

U.S. PATENT DOCUMENTS

| | | | | |
|---|---|---|---|---|
| 4,073,340 | A | 2/1978 | Parker | |
| 4,184,536 | A | 1/1980 | Smith et al. | |
| 4,291,754 | A | 9/1981 | Morse et al. | |
| 4,344,481 | A | 8/1982 | Urie et al. | |
| 4,475,586 | A | 10/1984 | Grieb et al. | |
| 5,251,692 | A | 10/1993 | Haussmann | |
| 5,270,572 | A | 12/1993 | Nakajima et al. | |
| 5,511,613 | A | 4/1996 | Mohn et al. | |
| 5,967,228 | A | 10/1999 | Bergman et al. | |
| 5,983,992 | A | 11/1999 | Child et al. | |
| 6,269,870 | B1 | 8/2001 | Banzhaf et al. | |
| 6,425,261 | B2 | 7/2002 | Burk et al. | |
| 6,427,764 | B2 * | 8/2002 | Nash | 165/82 |
| 6,460,613 | B2 | 10/2002 | Nash et al. | |
| 6,705,387 | B2 | 3/2004 | Kokubunji et al. | |
| 6,868,897 | B2 * | 3/2005 | Nash et al. | 165/82 |
| 2001/0025705 | A1 * | 10/2001 | Nash et al. | 165/167 |
| 2002/0029559 | A1 * | 3/2002 | Mandai et al. | 60/39.511 |
| 2003/0121649 | A1 * | 7/2003 | Seiler et al | 165/167 |
| 2004/0031598 | A1 | 2/2004 | Shimanuki et al. | |
| 2004/0050537 | A1 | 3/2004 | Kim et al. | |

FOREIGN PATENT DOCUMENTS

EP 1 083 398 A1 3/2001

* cited by examiner

*Primary Examiner*—Ehud Gartenberg
(74) *Attorney, Agent, or Firm*—Michael Best & Friedrich LLP

(57) ABSTRACT

A heat exchange cell for use in a recuperator includes top and bottom plates spaced apart to define therebetween an internal space. Within the internal space are inlet and outlet header tubes communicating with a plurality of internal matrix fins. The header tubes are rigidly affixed to at least one adjacent header tube and to the top and bottom plates. The header tubes may have a rectangular cross-section and may, for example, be metallurgically bonded to the top and bottom plates and to each other through brazing. Rigidly affixing the header tubes to each other reduces the stress on the fillets that bond the tubes to the top and bottom plates. This in turn permits less structural material to be used in the header portions of the cell and reduces pressure drop across the headers.

8 Claims, 4 Drawing Sheets

HEAT EXCHANGER WITH HEADER TUBES

BACKGROUND OF THE INVENTION

The invention relates to a heat exchanger having header tubes.

BRIEF DESCRIPTION OF THE INVENTION

The invention provides a heat exchange cell for use in a recuperator. The cell includes top and bottom plates spaced apart to define therebetween an internal space, each of the top and bottom plates defining an inlet and outlet opening communicating with the internal space for the respective inflow and outflow of fluid with respect to the internal space. The cell also includes a plurality of internal matrix fins within the internal space and metallurgically bonded to the top and bottom plates. The cell also includes a plurality of inlet header tubes within the internal space and communicating between the inlet opening and the matrix fins, each inlet header tube being rigidly affixed to at least one adjacent inlet header tube and to the top and bottom plates. The cell also includes a plurality of outlet header tubes within the internal space and communicating between the matrix fins and the outlet opening, each outlet header tube being rigidly affixed to at least one adjacent outlet header tubes and to the top and bottom plates.

The inlet header tubes may include flat portions that are rigidly affixed to the top and bottom plates and to the adjacent inlet header tubes. The inlet header tube may, for example, have a substantially rectangular cross-section having four flat sides, wherein two of the flat sides are rigidly affixed to the respective top and bottom plates and the other two of the flat sides are rigidly affixed to adjacent inlet header tubes. The inlet header tubes may be metallurgically bonded to each other and to the top and bottom plates.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MW may utilize one or more-microturbine engines.

Figure 1:
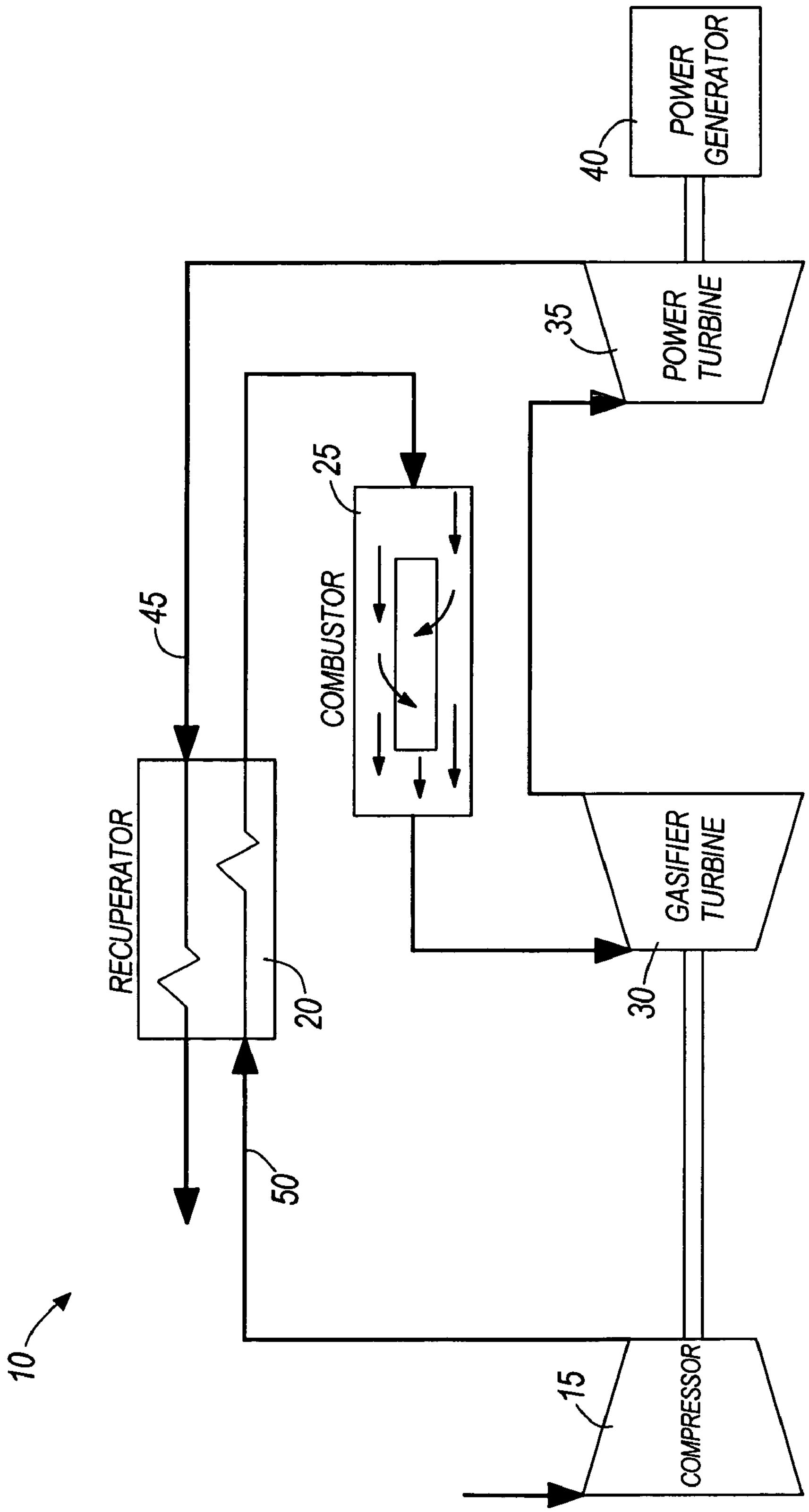
FIG. 1 is a schematic representation of a microturbine engine including a recuperator according to the present invention.

FIG. 1 illustrates a microturbine engine 10 that includes a compressor 15, a recuperator 20, a combustor 25, a gassifier turbine 30, a power turbine 35, and a power generator 40. Air is compressed in the compressor 15 and delivered to the recuperator 20. With additional reference to FIG. 2, heat is exchanged in the recuperator 20 between a flow of hot gases 45 and the flow of compressed air 50, such that the flow of compressed air 50 is preheated. The preheated air is mixed with fuel and the mixture is combusted in the combustor 25 to generate a flow of products of combustion or hot exhaust gases. The use of a recuperator 20 to preheat the air allows for the use of less fuel to reach the desired temperature within the flow of products of combustion, thereby improving engine efficiency.

The flow of hot exhaust gases drives the rotation of the gassifier turbine 30 and the power turbine 35, which in turn drives the compressor 15 and power generator 40, respectively. The power generator 40 generates electrical power in response to rotation of the power turbine 35. After exiting the gassifier and power turbines 30, 35, the flow of exhaust gases, which is still very hot, is directed to the recuperator 20, where it is used as the aforementioned flow of hot gases 45 in preheating the flow of compressed air 50. The exhaust gas then exits the recuperator 20 and is discharged to the atmosphere, processed, or used in other processes (e.g., cogeneration using a second heat exchanger).

The engine 10 shown is a multi-spool engine (more than one set of rotating elements). As an alternative to the construction illustrated in FIG. 1 and described above, a single radial turbine may drive both the compressor 15 and the power generator 40 simultaneously. This arrangement has the advantage of reducing the number of turbine wheels. Also, the illustrated compressor 15 may be a centrifugal-type compressor having a rotary element that rotates in response to operation of the gassifier turbine 30. The compressor 15 may be a single-stage compressor or a multi-stage compressor (when a higher pressure ratio is desired). Alternatively, compressors of different designs (e.g., axial-flow compressors, reciprocating compressors, scroll compressor) can be employed to supply air to the engine 10.

The gassifier and power turbines 30, 35 may be radial inflow single-stage turbines each having a rotary element directly or indirectly coupled to the rotary element of the respective compressor 15 and power generator 40. Alternatively, multi-stage turbines or axial flow turbines may be employed for either or both of the gassifier and power turbines 30, 35. A gearbox or other speed reducer may be used to reduce the speed of the power turbine 35 (which may be on the order of 50,000 RPM, for example) to a speed usable by the power generator 40 (e.g., 3600 or 1800 RPM for a 60 Hz system, or 3000 or 1500 RPM for a 50 Hz system). Although the above-described power generator 40 is a synchronous-type generator, in other constructions, a permanent magnet, or other non-synchronous generator may be used in its place.

Figure 2:
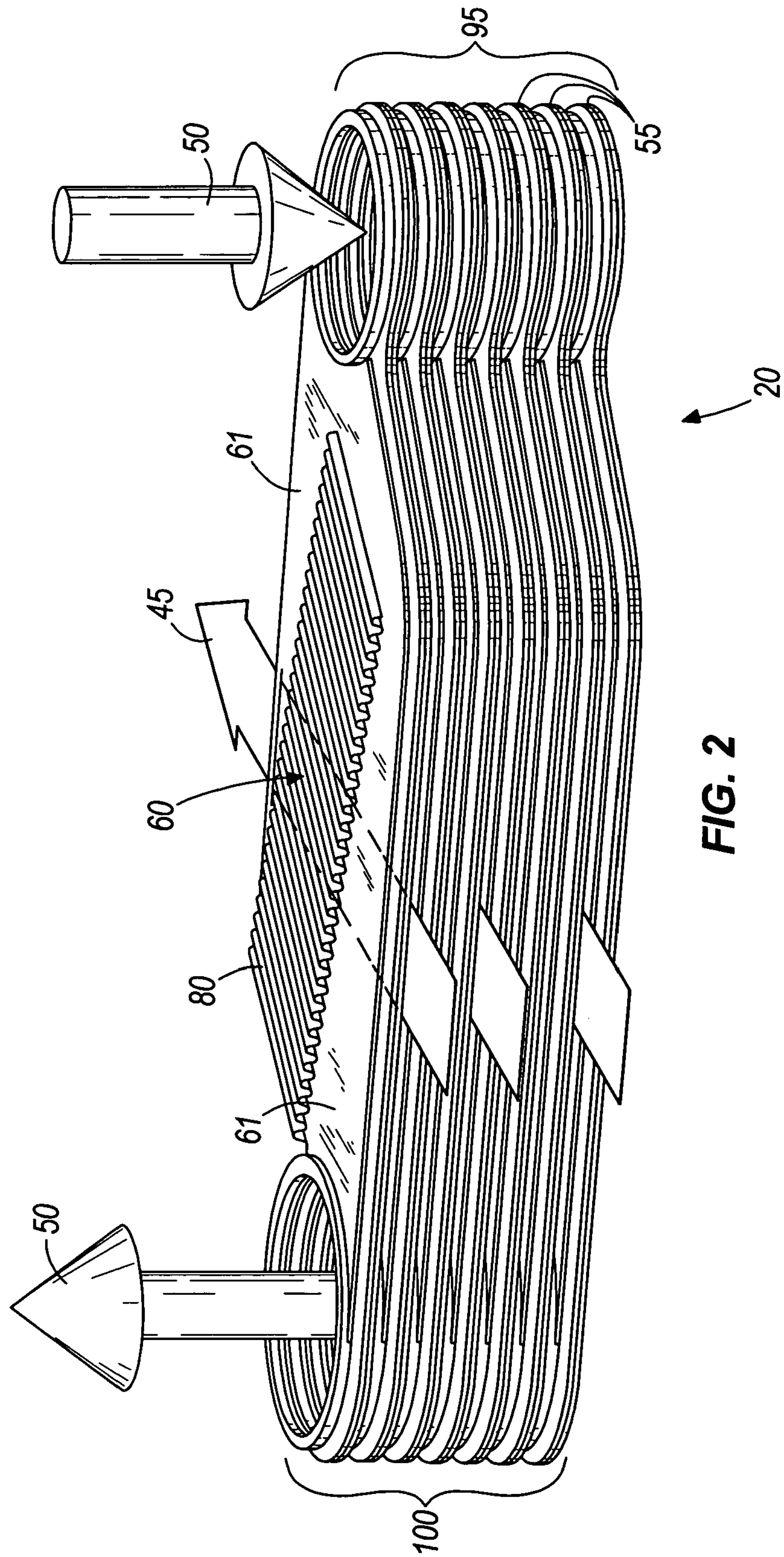
FIG. 2 is a perspective view of the core of the recuperator of FIG. 1.

FIG. 2 illustrates the recuperator 20 constructed of a plurality of heat exchange cells 55. The relatively hot and cool gases 45, 50, respectively, flow generally parallel and opposite to each other through the center portion (hereinafter referred to as the matrix portion 60) of the recuperator 20, with the hot gases 45 flowing between the cells and the relatively cool gases 50 flowing inside the cells 55. Header portions 61 of the cells 55 direct the compressed air 50 into the matrix portion 60 along a flow path that is generally perpendicular to the flow path in the matrix portion 60. In this regard, the illustrated recuperator 20 may be termed a counterflow recuperator with crossflow headers.

Figure 3:
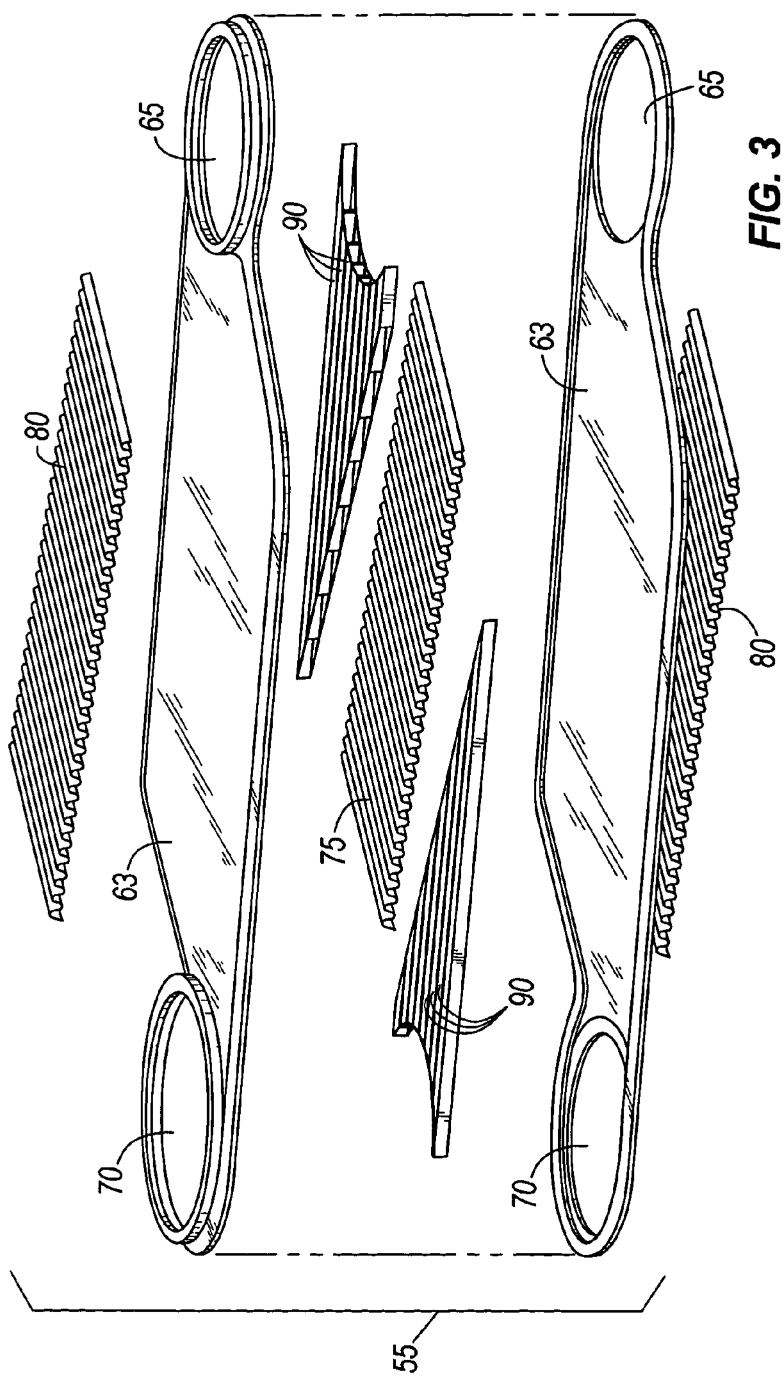
FIG. 3 is an exploded view of one cell of the recuperator of FIG. 2.

With reference to FIG. 3, the recuperator cells 55 include top and bottom plates 63 that are joined (e.g., by welding, fastening, or another means for substantially air-tightly joining the plates) together along their entire edges or peripheries. The generally flat central parts of the plates 63 are generally parallel to each other and define therebetween an internal space. The cell 55 includes inlet and outlet holes 65, 70 communicating with the internal space.

Internal matrix fins 75 are metallurgically bonded (e.g., by welding, brazing, or another joining process that facilitates heat transfer) to the inside surfaces of the top and bottom plates 63 and are thus within the internal space of the cell 55. External matrix fins 80 are metallurgically bonded to the outer surfaces of the top and bottom plates 63 above and below the internal matrix fins 75. The internal and external matrix fins 75, 80 are in the matrix portion 60 of the recuperator 20 and their corrugated fins are generally parallel to each other. Most of the heat exchange between the fluid 50 flowing through the cells 55 and the fluid 45 flowing between the cells 55 occurs in the matrix portion 60 and is aided by the internal and external matrix fins 75, 80. It is therefore desirable to maximize the heat transfer capability of the recuperator 20 within the matrix portion 60.

Figure 4:
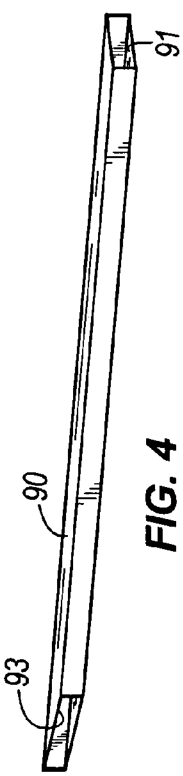
FIG. 4 is a perspective view of one of the header tubes of the recuperator of FIG. 3.
Figure 5:
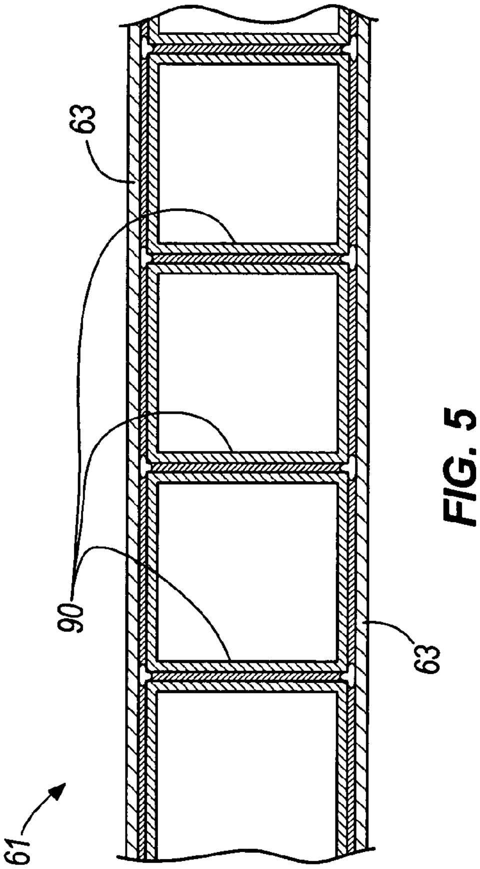
FIG. 5 is a cross-section view of a portion of a header of a recuperator cell.

With reference to FIGS. 3–5, header tubes 90 are arranged in parallel fashion in the inlet and outlet header portions 61 of each cell 55. The header tubes 90 are metallurgically bonded to the top and bottom plates 63 and are also metallurgically bonded to each other. The header tubes 90 have generally rectangular cross sections (e.g., they may be generally square or have another rectangular shape) with top, bottom, and side walls. The side walls of adjacent tubes 90 are generally parallel and in close proximity to each other, and are metallurgically bonded to each other. As seen in FIG. 4, the end 91 of each header tube 90 adjacent the inlet and outlet openings 65, 70 may be cut or formed to follow the curvature of the openings 65, 70 (as illustrated) or may be cut at right angles to the side and top walls of the tube 90. The end 93 of each tube 90 adjacent the matrix fins 75 is cut at an angle so that each tube 90 communicates with a plurality of the matrix fins.

To construct the recuperator core (as in FIG. 2) 20, each cell 55 is positioned with its inlet and outlet holes 65, 70 in alignment with the respective inlet and outlet holes 65, 70 of the other cells 55. The top plate 63 of each cell 55 is joined to the bottom plate 63 of the cell 55 above it along the edge of the inlet and outlet holes 65, 70. The resulting generally cylindrical spaces defined by the stacked inlet and outlet holes 65, 70 are referred to as the inlet and outlet manifolds 95, 100, respectively, of the recuperator 20. The inlet manifold 95 delivers the compressed air 50 to the internal space of the cells 55 and the outlet manifold 100 delivers preheated compressed air 50 to the combustor 25.

The internal spaces of the cells 55 are pressurized by the compressed air flowing through them. The internal matrix fins 75 and the header tubes 90 must withstand the tensile load that results from the pressure forcing the top and bottom plates 63 away from each other. The purpose of the header regions 61 of the cells 55 is to deliver the compressed air to or from the matrix portion 60 with as little frictional loss (i.e., pressure drop) as possible while still maintaining the structural stability of the header portion 61; minimizing pressure drop is a more important design consideration in the header portion 61 than maximizing heat transfer. The purpose of the matrix portion 60 is to transfer as much heat as possible from the relatively hot gases 45 flowing between the cells 55 to the relatively cool gases 50 flowing within the cells 55; maximizing heat transfer is a more important design consideration in the matrix portion 60 than minimizing pressure drop.

The internal matrix fins 75 are constructed of a corrugated material (sometimes referred to as "folded fins") having a relatively high fin density. The corrugated material is metallurgically bonded to the top and bottom plates 63 at each crest and trough. The high fin density provides more heat transfer and load bearing paths to enhance heat transfer and structural stability in the matrix portion 60.

Figure 6:
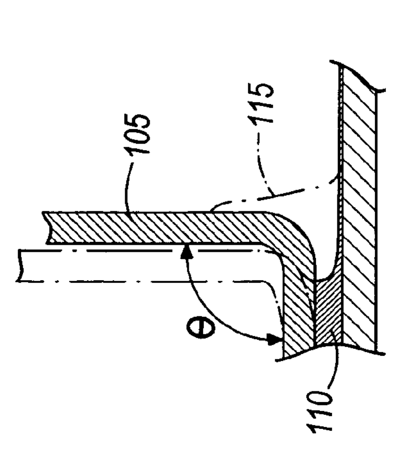
FIG. 6 is an enlarged cross-section view of a known header fin.

FIG. 6 illustrates the effect of high pressure in the header portion 61 of the cells 55 when corrugated header fins 105 are used. The fin density in the header portion 61 is typically kept as low as possible to reduce pressure drop across the header portion 61. However, the lower fin density also reduces the number of tensile stress bearing fins in the header portion 61. As the fin density in the header portion 61 is decreased, the degree to which the top and bottom plates 63 are separated as a result of the internal pressure increases.

Separation of the top and bottom plates 63 applies bending stresses to the fillets 110 connecting the corrugated fins 105 to the top and bottom plates 63. As used herein, the term "fillet" means the deposit of metallurgically bonding material (e.g., welding flux, brazing material or the material used in any other metallurgically bonding process) connecting the top and bottom plates 63 and the illustrated corrugated header fins 105 or header tubes 90 (seen in FIG. 6). More specifically, as seen in phantom in FIG. 6, as the top and bottom plates 63 move apart, the fins 105 stretch and achieve a steeper orientation as the angle θ decreases. This applies a bending stress on the fillet 110.

One way to reduce the bending stress on the fillet 110 is to increase the size of the fillet 110 to cover the entire corner of the fin (e.g., a fillet bounded by the phantom line 115 in FIG. 6). However, there is an upper limit to the practical size of a fillet 110 because larger fillets tend to result in voids, and metallurgical transformation in the fillet material that may weaken the fillet 110.

Another way to reduce the bending stress on the fillet 110 is to increase the fin density to provide more tensile load bearing paths in the header portion 61. This would reduce or eliminate the extent to which the top and bottom plates 63 can move apart, which would in turn reduce the deflection of the fin and the bending stress on the fillet 110. However, there is a limit to the acceptable fin density in the header portion 61 of the cell 55 because of the resultant increase in pressure drop.

Figure 7:
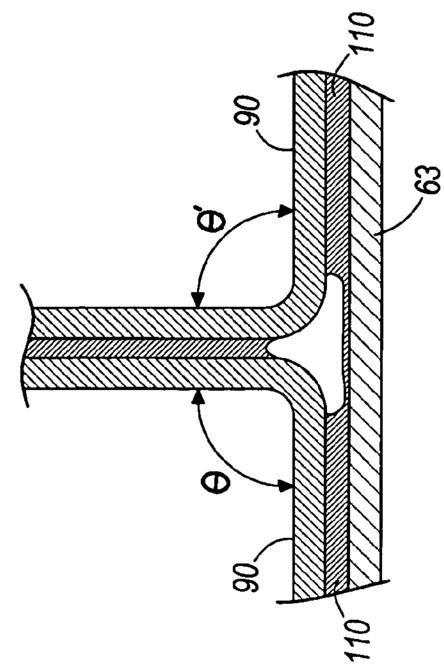
FIG. 7 is an enlarged cross-section view of a portion of two adjacent header tubes according to the present invention.

FIG. 7 illustrates the corners of adjacent rectangular header tubes 90. Although the illustrated tubes 90 are metallurgically bonded to each other and to the top and bottom plates 63, the tubes 90 may alternatively be joined to each other and to the top and bottom plates 63 in other suitable ways, especially because the heat transfer capability of the header portion 61 is not a driving design factor. The header tubes 90 may therefore, for example, be mechanically joined with fasteners, clips, or the like. The most economical means for joining the tubes 90 to the top and bottom plates 63 and to each other, however, is currently thought to be via metallurgical bonding via brazing, as illustrated.

Because the sides of the rectangular tubes 90 are fixed to each other, any deflection of one would have to be shared by the adjacent side of the adjacent tube 90. Separation of the top and bottom plates 63 would require both angles θ and θ' to decrease. The adjacent tubes 90 therefore offset each other and the tensile load is born by the tubes 90 without significant deflection of their sides and consequently without significant bending stresses on the fillets 110. Thus, fillets 110 of optimal size may be used and the amount of structural material (e.g., fin density) may be kept relatively low to reduce pressure drop across the header portions 61. A header fin constructed of a corrugated material 105 (as in FIG. 6) is unable to take advantage of the structural superiority of the rectangular tubes 90 illustrated in FIG. 7 because the fins of the corrugated material 105 do not have any adjacent fins to which they may be metallurgically bonded.

Although the illustrated header tubes 90 have rectangular cross-sections, other cross-sectional shapes are contemplated by the invention. For example, the tubes may be generally circular in shape with four flats that may be rigidly affixed to the top and bottom sheets and to the adjacent tubes. The header tubes could also have a polygonal cross-sectional shape, such as octagonal, which provides flat surfaces for rigidly affixing to the top and bottom sheets and to the adjacent tubes.

The invention claimed is:

1. A heat exchange cell for use in a recuperator, the cell comprising:

top and bottom plates spaced apart to define therebetween an internal space, each of the top and bottom plates defining inlet and outlet openings communicating with the internal space for the respective inflow and outflow of fluid with respect to the internal space;

a plurality of internal matrix fins within the internal space and metallurgically bonded to the top and bottom plates;

a plurality of inlet header tubes within the internal space and communicating between the inlet opening and the matrix fins, each inlet header tube being rigidly affixed to at least one adjacent inlet header tube and to the top and bottom plates; and a plurality of outlet header tubes within the internal space and communicating between the matrix fins and the outlet opening, each outlet header tube being rigidly affixed to at least one adjacent outlet header tube and to the top and bottom plates.

2. The cell of claim 1, wherein each inlet header tube includes flat portions that are rigidly affixed to the top and bottom plates and to the adjacent inlet header tubes.

3. The cell of claim 1, wherein each inlet header tube has a substantially rectangular cross-section having four flat sides, wherein two of the flat sides are rigidly affixed to the respective top and bottom plates and the other two of the flat sides are rigidly affixed to adjacent inlet header tubes.

4. The cell of claim 1, wherein the inlet header tubes are metallurgically bonded to each other and to the top and bottom plates.

5. A microturbine engine comprising:

a compressor providing a flow of compressed air;

a recuperator receiving the flow of compressed air from the compressor and heating the flow of compressed air with heat from a flow of exhaust gas;

a combustor receiving the heated flow of compressed air from the recuperator, mixing the flow of compressed air with fuel, and combusting the mixture of fuel and compressed air to create the flow of exhaust gas;

at least one turbine receiving the flow of exhaust gas from the combustor and rotating in response to the flow of exhaust gas, rotation of the at least one turbine driving the compressor; and a power generator generating electricity in response to the rotation of the at least one turbine;

wherein the exhaust gas flows from the at least one turbine to the recuperator for use in heating the flow of compressed air;

wherein the recuperator includes a plurality of cells, each cell including: top and bottom plates spaced apart to define therebetween an internal space, each of the top and bottom plates defining inlet and outlet openings communicating with the internal space for the respective inflow and outflow of the flow of compressed air with respect to the internal space; a plurality of internal matrix fins within the internal space and metallurgically bonded to the top and bottom plates; a plurality of inlet header tubes within the internal space and communicating between the inlet opening and the matrix fins, each inlet header tube being rigidly affixed to at least one adjacent inlet header tube and to the top and bottom plates; and a plurality of outlet header tubes within the internal space and communicating between the matrix fins and the outlet opening, each outlet header tube being rigidly affixed to at least one adjacent outlet header tubes and to the top and bottom plates;

wherein the flow of compressed air flows into the internal space of the cells through the inlet header tubes, then through the matrix fins, then through the outlet header tubes prior to flowing to the combustor; and wherein the flow of exhaust gas flows through the recuperator in-between the cells in generally counter-flowing relationship with the flow of compressed air through the matrix fins within the cells.

6. The engine of claim 5, wherein each inlet header tube includes flat portions that are rigidly affixed to the top and bottom plates and to the adjacent inlet header tubes.

7. The engine of claim 5, wherein each inlet header tube has a substantially rectangular cross-section having four flat sides, wherein two of the flat sides are rigidly affixed to the respective top and bottom plates and the other two of the flat sides are rigidly affixed to adjacent inlet header tubes.

8. The engine of claim 5, wherein the inlet header tubes are metallurgically bonded to each other and to the top and bottom plates.

* * * * *